(12) United States Patent
Tsubaki

(10) Patent No.: US 10,046,790 B2
(45) Date of Patent: Aug. 14, 2018

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/738,370

(22) PCT Filed: May 12, 2017

(86) PCT No.: PCT/JP2017/017980
§ 371 (c)(1),
(2) Date: Dec. 20, 2017

(87) PCT Pub. No.: WO2017/195883
PCT Pub. Date: Nov. 16, 2017

(65) Prior Publication Data
US 2018/0178828 A1 Jun. 28, 2018

(30) Foreign Application Priority Data

May 12, 2016 (JP) ................................ 2016-095924
May 12, 2016 (JP) ................................ 2016-095925
May 12, 2016 (JP) ................................ 2016-095926

(51) Int. Cl.
*H02P 21/00* (2016.01)
*B62D 5/04* (2006.01)
(Continued)

(52) U.S. Cl.
CPC .............. *B62D 5/046* (2013.01); *B62D 6/08* (2013.01); *H02P 21/0003* (2013.01);
(Continued)

(58) Field of Classification Search
CPC ....................................................... H02P 21/22
(Continued)

(56) References Cited

U.S. PATENT DOCUMENTS 9,452,774 B2 * 9/2016 Jang .................... B62D 5/0409

FOREIGN PATENT DOCUMENTS

JP    2006-340446 A    12/2006
JP        5235536 B2     7/2013
(Continued)

OTHER PUBLICATIONS

International Search Report for PCT/JP2017/017980 dated Jul. 11, 2017 [PCT/ISA/210].

*Primary Examiner* — David S Luo
(74) *Attorney, Agent, or Firm* — Sughrue Mion, PLLC

(57) ABSTRACT

An electric power steering apparatus includes a torque control system to calculate a current command value and a current control system to control a motor current value passing through a motor based on the current command value. A first calculation period of the torque control system is equal to or longer than a second calculation period of the current control system. The current control system includes a specific frequency band removing section that attenuates a frequency component which multiplies at least one natural number by an approximate half of a calculation frequency of the torque control system to the current command value. The specific frequency band removing section includes notch filters that set an attenuation frequency or includes the notch filters and a phase delay filter that has a cutoff frequency, which is set to a lower frequency side than a frequency which is attenuated by the notch filters.

14 Claims, 15 Drawing Sheets

(51) Int. Cl.
*B62D 6/08* (2006.01)
*H02P 21/22* (2016.01)
*H02P 21/05* (2006.01)
*H02P 27/08* (2006.01)

(52) U.S. Cl.
CPC .............. *H02P 21/05* (2013.01); *H02P 21/22* (2016.02); *H02P 27/08* (2013.01)

(58) Field of Classification Search
USPC .............................. 318/400.02, 400.01, 700
See application file for complete search history.

(56) References Cited

FOREIGN PATENT DOCUMENTS

| | | |
|---|---|---|
| JP | 5456576 B2 | 4/2014 |
| JP | 2014-141173 A | 8/2014 |
| WO | 2017/030067 A1 | 2/2017 |

\* cited by examiner

PRIOR ART

PRIOR ART

PRIOR ART

ELECTRIC POWER STEERING APPARATUS

CROSS REFERENCE TO RELATED APPLICATIONS

This application is a National Stage of International Application No. PCT/JP2017/017980, filed on May 12, 2017, which claims priority from Japanese Patent Application No. 2016-095924, filed on May 12, 2016, Japanese Patent Application No. 2016-095925, filed on May 12, 2016, and Japanese Patent Application No. 2016-095926, filed on May 12, 2016, the contents of all of which are incorporated herein by reference in their entirety.

TECHNICAL FIELD

The present invention relates to an electric power steering apparatus that comprises a torque control system to calculate a current command value based on at least a steering torque and a current control system to control a motor current value which passes through a motor (for example, a brushless motor driving-controlled by a vector control system) based on the current command value, in particular to the electric power steering apparatus that has a process function which attenuates a specific frequency band component and does not generate a phase delay, and exactly suppresses generations of a vibration and a noisy sound.

BACKGROUND ART

An electric power steering apparatus (EPS) which assist-controls a steering system of a vehicle by means of a rotational torque of a motor, applies a steering assist torque (an assist torque) to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a current command value and a detected motor current value becomes small, and the adjustment of the voltage applied to the motor is generally performed by an adjustment of a duty of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the steering wheel 1 and a steering angle sensor 14 for detecting a steering angle θ, and a motor 20 for assisting a steering force of the steering wheel 1 is connected to the column shaft 2 through the reduction gears 3. The electric power is supplied to a control unit (ECU) 100 for controlling the electric power steering apparatus from a battery 13, and an ignition key (IG) signal is inputted into the control unit 100 through an ignition key 11. The control unit 100 calculates a current command value of an assist command on the basis of the steering torque Th detected by the torque sensor 10 and a vehicle speed Vs detected by a vehicle speed sensor 12, and controls a current supplied to the motor 20 for the EPS by means of a voltage control value Vref obtained by performing compensation or the like to the current command value.

A steering angle sensor 14 is not indispensable and may not be provided. It is possible to obtain the steering angle from a rotational position sensor such as a resolver which is connected to the motor 20.

A controller area network (CAN) 50 to send/receive various information and signals on the vehicle is connected to the control unit 100, and it is also possible to receive the vehicle speed Vs from the CAN 50. Further, a Non-CAN 51 is also possible to connect to the control unit 100, and the Non-CAN 51 sends and receives a communication, analogue/digital signals, electric wave or the like except for the CAN 50.

The control unit 100 mainly comprises an MCU (Micro Controller Unit) (including a CPU (Central Processing Unit) and an MPU (Micro Processor Unit)), and general functions performed by programs within the MCU are, for example, shown in FIG. 2.

Functions and operations of the control unit 100 will be described with reference to FIG. 2. As shown in FIG. 2, the steering torque Th detected by the torque sensor 10 and the vehicle speed Vs detected by the vehicle speed sensor 12 (or from the CAN 50) are inputted into a current command value calculating section 101 which calculates the current command value Iref. The current command value calculating section 101 calculates the current command value Iref, based on the steering torque Th and the vehicle speed Vs with reference to an assist map or the like, which is a control target value of a current supplied to the motor 20. The calculated current command value Iref is inputted into a maximum-output limiting section 102 which limits a maximum current in accordance with an overheat protection condition, and the current command value Irefh whose maximum current is limited is inputted into a subtracting section 103. A current deviation ΔI (=Irefh−Im) between the current command value Irefh and a motor current value Im which is fed-back is calculated at the subtracting section 103, and the current deviation ΔI is inputted into a proportional-integral-control (PI-control) section 104 for improving a current characteristic of the steering operation. The voltage control command value Vref that the characteristic is improved at the PI-control section 104, is inputted into a PWM-control section 105, and the motor 20 is PWM-driven through an inverter 106 serving as a driving section. The motor current value Im of the motor 20 is detected by a motor current detector 107 and is fed-back to the subtracting section 103. An FET is used as a driving device at the inverter 106, and the inverter 106 is constituted by a bridge circuit of the FET.

In such an electric power steering apparatus, since structure members and peripheral members of the apparatus form a resonant system and generate a vibration, a noisy sound or the like due to the resonance of the resonant systems, it is desired to suppress the vibration and the noisy sound and various counter measures are proposed.

For example, in Japanese Patent No. 5456576 B2 (Patent Document 1), technology, which removes mechanical resonant frequency components of the structure members of the electric power steering apparatus such as a column and a rack or a rigid body portion of a vehicle front structure, is proposed. In the Patent Document 1, the mechanical resonant frequency components are removed by using a band cut filter (a band stop filter (BPF)) having a steep attenuation characteristic or a notch filter, or a combination of those filters and a low pass filter (LPF) of the second order or more.

Further, in Japanese Patent No. 5235536 B2 (Patent Document 2), the noise occurred due to the calculation is removed by using the LPF at an assist control end.

THE LIST OF PRIOR ART DOCUMENTS

Patent Documents

Patent Document 1: Japanese Patent No. 5456576 B2
Patent Document 2: Japanese Patent No. 5235536 B2

SUMMARY OF THE INVENTION

Problems to be Solved by the Invention

However, in the control unit 100 of the electric power steering apparatus, although the control system (a torque control system) from inputs of the steering torque Th and the vehicle speed Vs to an output of the current command value Irefh and the control system (a current control system) from an input of the current command value Irefh to an output of the motor current value Im are periodically performed, an update period of the current command value in the current control system is influenced by an update period of the current command value in the torque control system in a case that the calculation period Ts_trq [sec] of the torque control system and the calculation period Ts_cur [sec] of the current control system are defined as "Ts_trq≥Ts_cur". For example, when the current command value in the torque control system at a time when the handle is arbitrarily steered, is analyzed by using a fast Fourier transform (FFT) at the calculating period Ts_cur of the current control system, remarkable spectra are generated every half of a calculation frequency fs_trq (=1/Ts_trq) of the torque control system. FIG. 3 shows the above spectra, and a horizontal axis denotes the frequency [Hz] and a vertical axis denotes the power spectra of the current command value as the power spectra [dB]. As shown by dashed lines in FIG. 3, the steep power spectra are generated near the frequencies which multiply natural numbers by "fs_trq/2". Since "fs_trq/2" is corresponding to a Nyquist frequency to a sampling of the current command value in the torque control system, the power spectra become large at the frequencies which multiply natural numbers by "fs_trq/2". The same phenomenon is occurred even in the electric power steering apparatus of the vector control system which uses the brushless motor.

When such steep power spectra are occurred, regardless of whether the resonant frequency band of the electric power steering apparatus (for example, mechanical resonance in a range of a few hundred [Hz] to a few [kHz] and so on) exists or not, the steep power spectra become a vibration source and cause the vibration, the noisy sound or the like.

In the Patent Document 1, in order to remove the mechanical resonant frequency components, since a filter having a steep attenuation characteristic in the narrow frequency band is used, it is difficult to attenuate the power spectra occurred due to the above described relationship between the calculation period of the torque control system and the calculation period of the current control system of which frequency bands are different. In this connection, it is impossible to exactly suppress the vibration, the noisy sound or the like which are generated from the power spectra as the vibration source. Further, in the Patent Document 2, since the noise generated due to the calculation is removed by using the LPF, the similar problem is caused.

The present invention has been developed in view of the above-described circumstances, and an object of the present invention is to provide the electric power steering apparatus (including the electric power steering apparatus of the vector control system) that can exactly suppress the vibration, the noisy sound or the like, which are generated from the power spectra as the vibration source, by attenuating the power spectra which generate from the relationship between the calculation period of the torque control system and the calculation period of the current control system.

Means for Solving the Problems

The present invention relates to an electric power steering apparatus that comprises a torque control system to calculate a current command value based on at least a steering torque and a current control system to control a motor current value which passes through a motor based on the current command value, the above-described object of the present invention is achieved by that: wherein a first calculation period of the torque control system is equal to or longer than a second calculation period of the current control system, wherein the current control system comprises a specific frequency band removing section that attenuates a frequency component which multiplies at least one natural number by an approximate half of a calculation frequency of the torque control system to the current command value, and wherein the specific frequency band removing section comprises notch filters that set an attenuation frequency.

The above-described object of the present invention is efficiently achieved by that wherein the specific frequency band removing section further comprises a phase delay filter that has a cutoff frequency, which is set to a lower frequency side than a frequency which is attenuated by the notch filters, and is connected to the notch filters in series; or wherein the notch filters comprise plural notch filters that are connected in series; or wherein the phase delay filter comprises a first order or a second order configuration; or wherein the specific frequency band removing section inputs the current command value that is outputted from the torque control system, or inputs a current deviation between the current command value and the motor current value; or wherein the motor is a brushless motor, and the brushless motor is driving-controlled by a vector control system; or wherein the vector control system is three-phase feedback-type vector control; or wherein the vector control system is two-phase feedback-type vector control.

Effects of the Invention

The electric power steering apparatus according to the present invention attenuates the power spectra that are generated from the relationship between the calculation period of the torque control system and the calculation period of the current control system, and decreases the phase delay in a control band by using the notch filter that attenuates the frequency components which multiply natural numbers by a half of the calculation frequency of the torque control system, or by using the notch filter that attenuates the frequency components which multiply natural numbers by a half of the calculation frequency of the torque control system, and the phase delay filter that recovers the phase. Consequently, the electric power steering apparatus of the present invention can exactly suppress the vibration, the noisy sound or the like which are generated from the power spectra as the vibration source, regardless of whether the resonant frequency band of the electric power steering apparatus (for example, the mechanical resonance in a range of a few hundred [Hz] to a few [kHz]) exists or not. The same is true of even the electric power steering apparatus of the vector control system.

MODE FOR CARRYING OUT THE INVENTION

In the present invention, steep power spectra, which are generated from a relationship between a calculation period Ts_trq of a torque control system and a calculation period Ts_cur of a current control system, are attenuated by using a filter having a steep attenuation characteristic in a narrow band such as a notch filter, and a process having no phase delay is performed by connecting a phase delay filter in series. Concretely, in a case of "Ts_trq≥Ts_cur", the steep power spectra, which are generated every half of a calculation frequency fs_trq (=1/Ts_trq) of the torque control system, are attenuated by using the notch filter. The calculation period Ts_trq of the torque control system would be different from the calculation period Ts_cur of the current control system due to that, for example, calculation amounts of the respective control systems are different and so on, and it would be set "Ts_trq≥Ts_cur" when the calculation amount of the torque control system is larger than that of the current control system. In this case, the above power spectra are generated. In a case of "Ts_trq<Ts_cur", since a Nyquist frequency (=calculation frequency/2) in the torque control system is higher than a Nyquist frequency in the current control system, generation of the above power spectra is suppressed.

Since such the steep power spectra serve as the vibration source and cause the vibration, the noisy sound or the like, it is possible to decrease an influence to another frequency bands and exactly suppress the vibration, the noisy sound or the like by attenuating a predetermined frequency band at pinpoint by means of the notch filter. Further, in the present invention, a phase delay filter is connected to a rear stage of the notch filter, and then an occurrence of the phase delay is prevented. As well, a filter that a frequency band to block is especially narrow among the band stop filters, is the notch filter.

Embodiments according to the present invention will be described with reference to the drawings.

Figure 1:
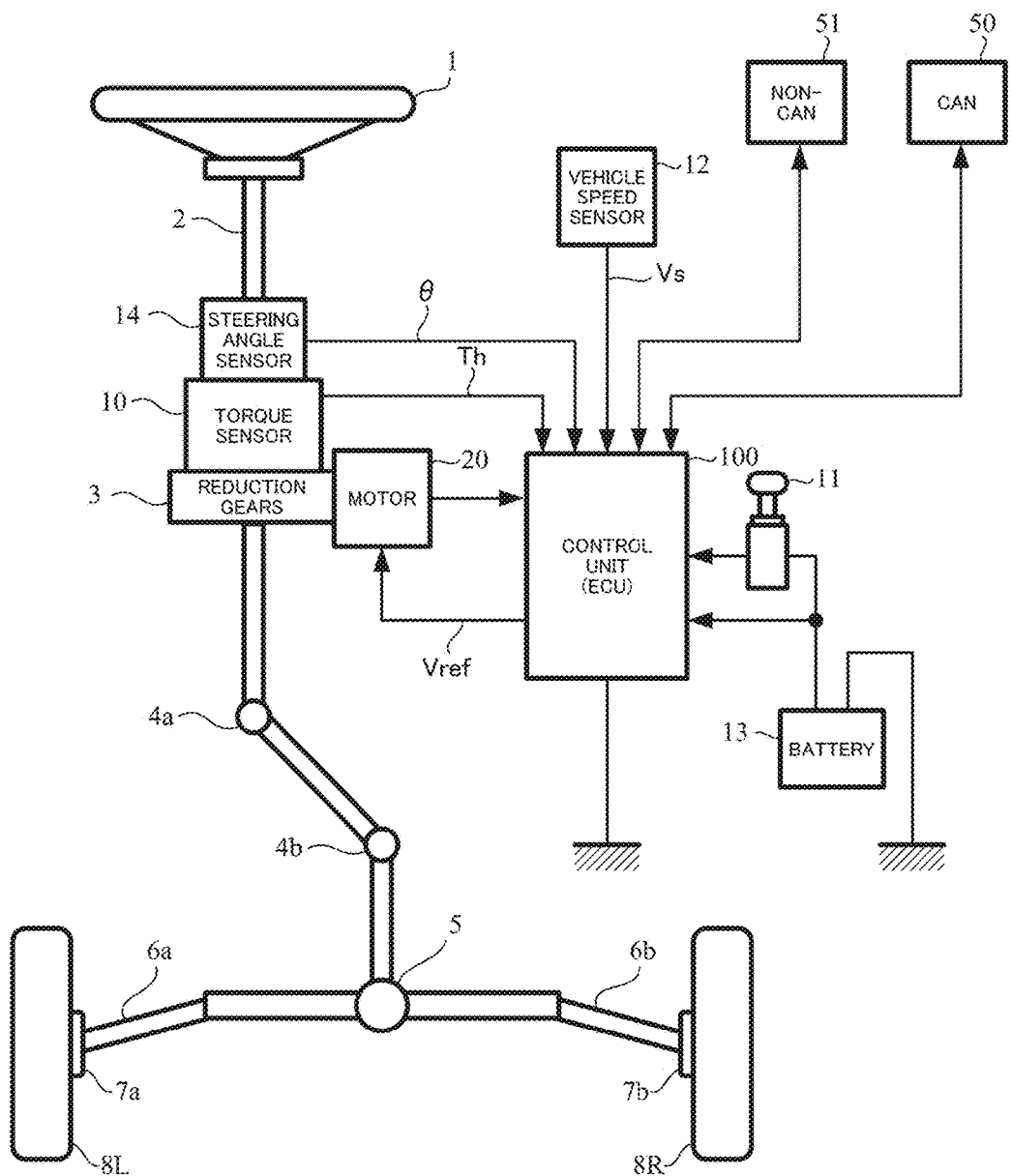
FIG. 1 is a configuration diagram showing a general outline of an electric power steering apparatus.
Figure 2:
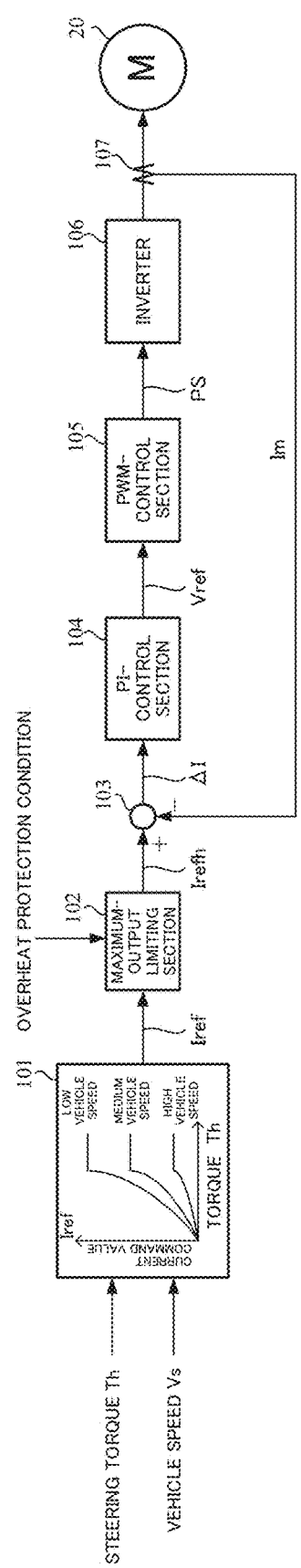
FIG. 2 is a block diagram showing a general configuration example of a control unit (ECU) of the electric power steering apparatus.
Figure 4:
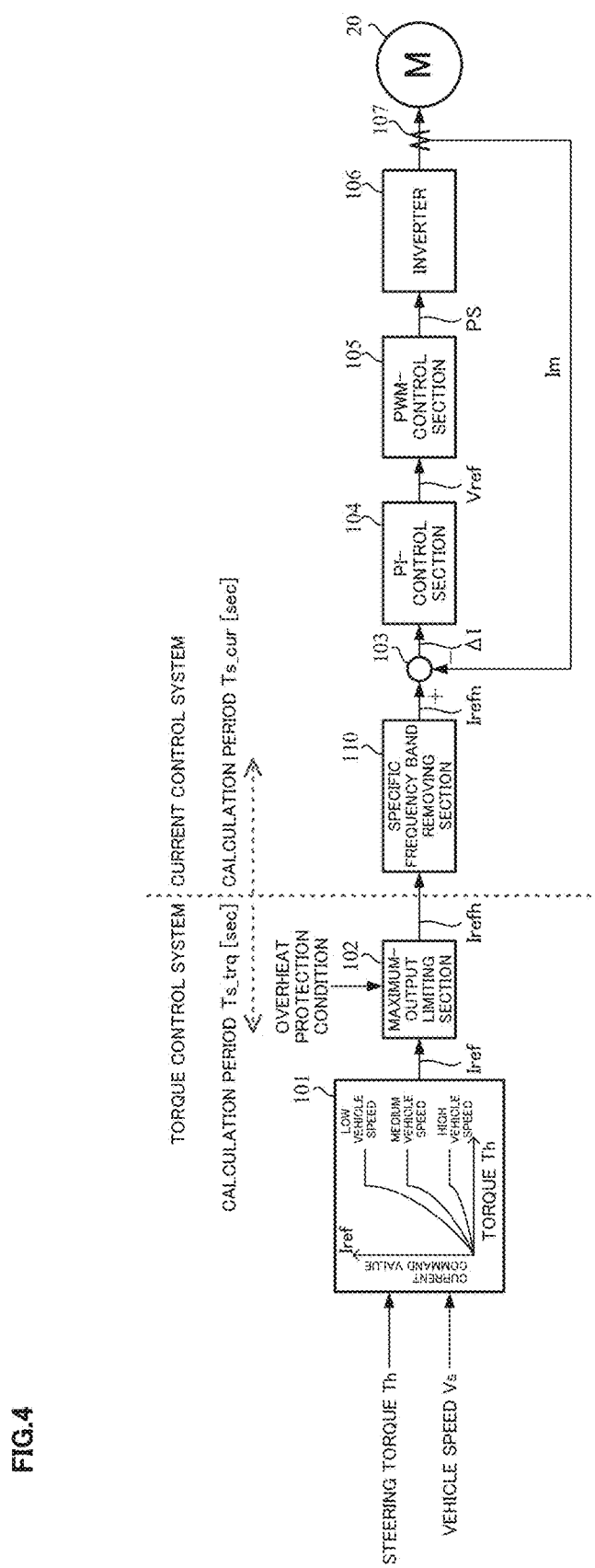
FIG. 4 is a block diagram showing a configuration example of the present invention.

FIG. 4 shows a configuration example of an embodiment of the present invention corresponding to FIG. 2. The same components which are defined in FIG. 2 assign the same reference numerals, and the explanation is omitted.

In the present configuration example, a specific frequency band removing section 110 is disposed between the maximum-output limiting section 102 and the subtracting section 103, and a current command value Irefh whose maximum output is limited is inputted into the specific frequency band removing section 110. A torque control system comprises the current command value calculating section 101 and the maximum-output limiting section 102, and a current control system comprises the specific frequency band removing section 110, the subtracting section 103, the PI-control section 104, the PWM-control section 105, the inverter 106 and the motor current detector 107. The torque control system performs the torque control in the calculation period Ts_trq, the current control system performs the current control in the calculation period Ts_cur, and a relationship "Ts_trq≥Ts_cur" is satisfied.

Figure 5:
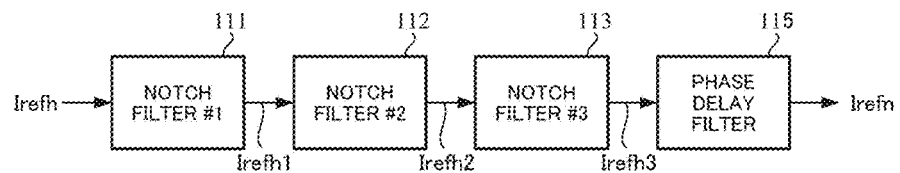
FIG. 5 is a block diagram showing a configuration example of a specific frequency band removing section (the first embodiment)

For example, as shown in FIG. 5 (the first embodiment), the specific frequency band removing section 110 comprises three notch filters 111, 112 and 113 which are connected in series and a phase delay filter 115 which is connected at a final stage. In order to attenuate the power spectra which are generated every half of the calculation frequency fs_trq (=1/Ts_trq) of the torque control system, attenuation frequencies of the notch filters 111, 112 and 113 are set to "fs_trq/2", "fs_trq" and "fs_trq×3/2", respectively. Here, the attenuation frequency indicates a frequency which has the smallest amplitude in an amplitude characteristic of the filter, and it is also called as a notch frequency, a central frequency or the like.

The respective notch filters 111, 112 and 113 are designed as a second order filter. In a case that the attenuation frequency is defined as "$f_e$", a frequency characteristic is represented by a transfer function G of the following Equation 1.

$$G = \frac{\omega_d^2}{\omega_n^2} \frac{s^2 + 2\zeta_n \omega_n s + \omega_n^2}{s^2 + 2\zeta_d \omega_d s + \omega_d^2} \quad \text{[Equation 1]}$$

Here, "$\omega_n = \omega_d = 2\pi \times f_e$" is satisfied, "s" denotes a Laplace operator and $\zeta_n$ and $\zeta_d$ denote the attenuation coefficients.

Figure 6:
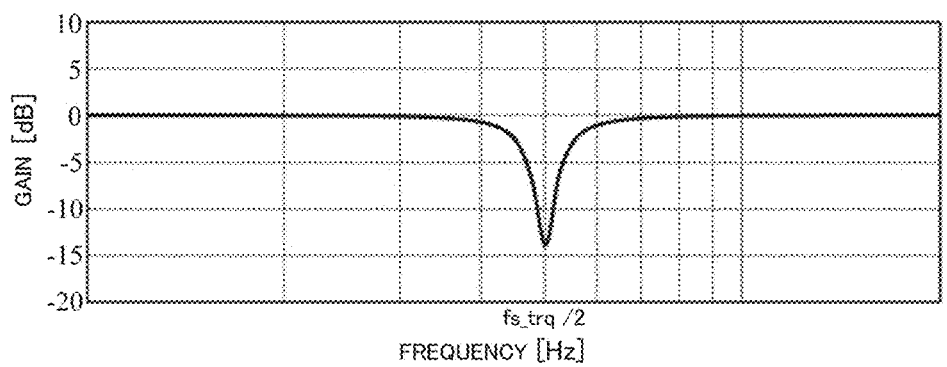
FIG. 6 is a frequency characteristic diagram showing one example of an amplitude characteristic of a notch filter.

In this case, the amplitude characteristic has an attenuation characteristic, for example, as shown in FIG. 6. In FIG. 6, a horizontal axis denotes the frequency [Hz], a vertical axis denotes the amplitude (gain) [dB] and the amplitude is smallest at the attenuation frequency $f_e$ ("fs_trq/2" in the present example).

The parameter of the Equation 1 which is preliminarily calculated and is set as "$f_e$=fs_trq/2" is stored in the notch filter 111, and the notch filter 111 transforms the inputted current command value based on the Equation 1. Similarly, the parameters of the Equation 1 which are preliminarily calculated and are set as "$f_e$=fs_trq" and "$f_e$=fs_trq×3/2" are stored in the notch filters 112 and 113, respectively, and the notch filters 112 and 113 transform the inputted current command value Irefh based on the Equation 1.

As well, connection orders of the notch filters 111, 112 and 113 except for the connection order shown in FIG. 5 may be appropriately changeable, and further a notch filter to attenuate a frequency "$f_e$=fs_trq×2" may be disposed.

The phase delay filter 115 is a first order or a second order configuration, and is represented by the transfer function of the following Equation 2, defining cutoff frequencies as $f_n$ and $f_d$.

$$\frac{T_n \cdot s + 1}{T_d \cdot s + 1} = \frac{\frac{1}{2\pi f_n} \cdot s + 1}{\frac{1}{2\pi f_d} \cdot s + 1} \quad \text{[Equation 2]}$$

The filter is defined as a first order phase delay filter when the relationship "the cutoff frequency $f_d$ of a denominator<the cutoff frequency $f_n$ of a numerator" is satisfied, and the relationship $f_d < f_e$ (=the attenuation frequency of the notch filter which is set to the highest frequency side) is satisfied in the present embodiment.

Further, when the filter is represented by the transfer function of the following Equation 3, the relationships "$\omega_n = 2\pi \times f_n$", "$\omega_d = 2\pi \times f_d$", "$\zeta_n > 0$" and "$\zeta_d > 0$" are satisfied and the relationship "$f_d < f_n$" is set, the filter is defined as a second order phase delay filter.

$$\frac{\omega_d^2}{\omega_n^2} \frac{s^2 + 2\zeta_n \omega_n s + \omega_n^2}{s^2 + 2\zeta_d \omega_d s + \omega_d^2} \quad \text{[Equation 3]}$$

Although not shown in FIG. 4, a sample-and-hold section is disposed between the maximum-output limiting section 102 of the torque control system and the specific frequency band removing section 110 of the current control system. Since the calculation period Ts_trq of the torque control system is different from the calculation period Ts_cur of the current control system, the current control system cannot receive data (the current command value) outputted from the torque control system in synchronous with the torque control system. Therefore, the sample-and-hold section memorizes (sampling) the data outputted from the torque control system, and holds the above data by a time when the current control system become able to receive them. Thereby, it is possible to eliminate the data loss. Besides, the sample-and-hold section may be included in the specific frequency band removing section 110.

Figure 7:
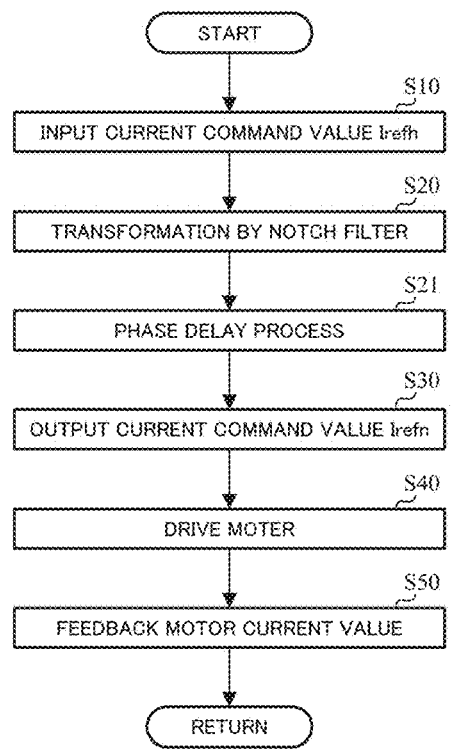
FIG. 7 is a flowchart showing an operation example of the present invention (the first embodiment)

In such a configuration, an operation example of the current control system will be described with reference to a flowchart of FIG. 7.

The current command value Irefh outputted from the maximum-output limiting section 102 of the torque control system is inputted into the specific frequency band removing section 110 of the current control system (Step S10). In the specific frequency band removing section 110, the notch filter 111 inputs the current command value Irefh and transforms the current command value Irefh based on the above Equation 1 by using the stored parameters. The transformed current command value Irefh1 is inputted into the notch filter 112 at a next stage and is similarly transformed to the current command value Irefh2 based on the above Equation 1, and the current command value Irefh2 is further inputted into the notch filter 113 and is similarly transformed to the current command value Irefh3 based on the above Equation 1 (Step S20). The current command value Irefh3 is phase-processed in the phase delay filter 115 at the final stage (Step S21) and the current command value Irefn, which is processed at the specific frequency band removing section 110 in this way, is outputted (Step S30). The current command value Irefn is inputted into the subtracting section 103, thereafter the above-described operations are similarly performed and the motor 20 is PWM-driven (Step S40). Then, the motor current value Im which is detected by the motor current detector 107 is fed-back to the subtracting section 103 (Step S50).

The above operations are repeated in the calculation period Ts_cur.

Figure 3:
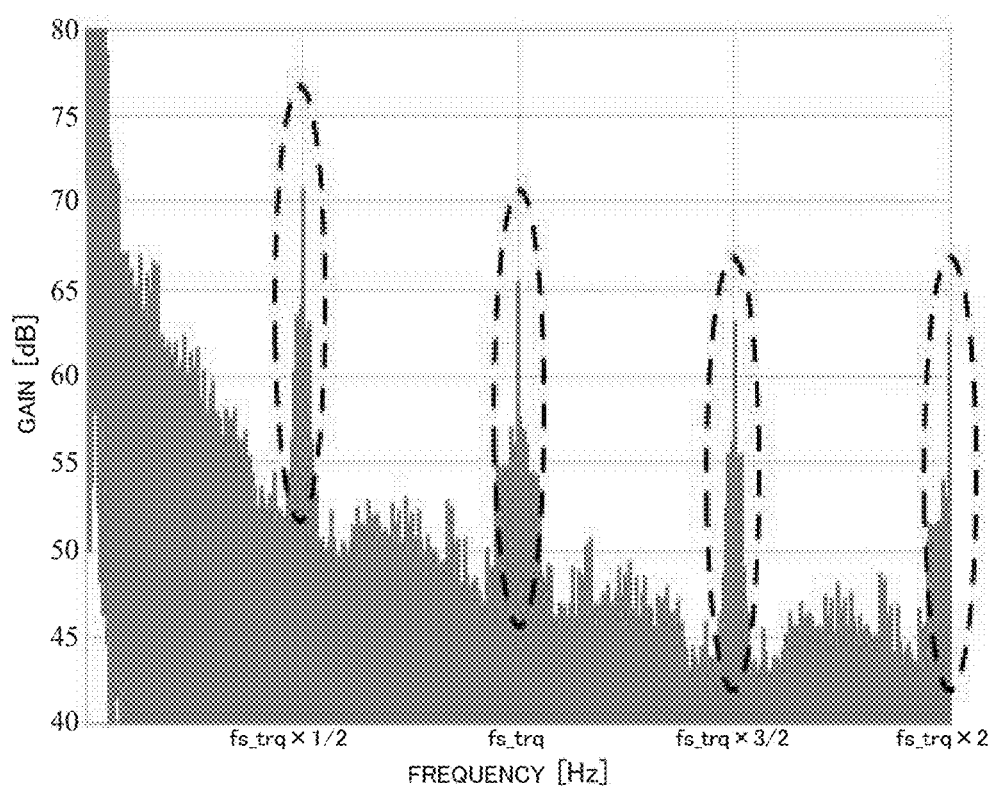
FIG. 3 is a graph showing an example of power spectra of a current command value.
Figure 8:
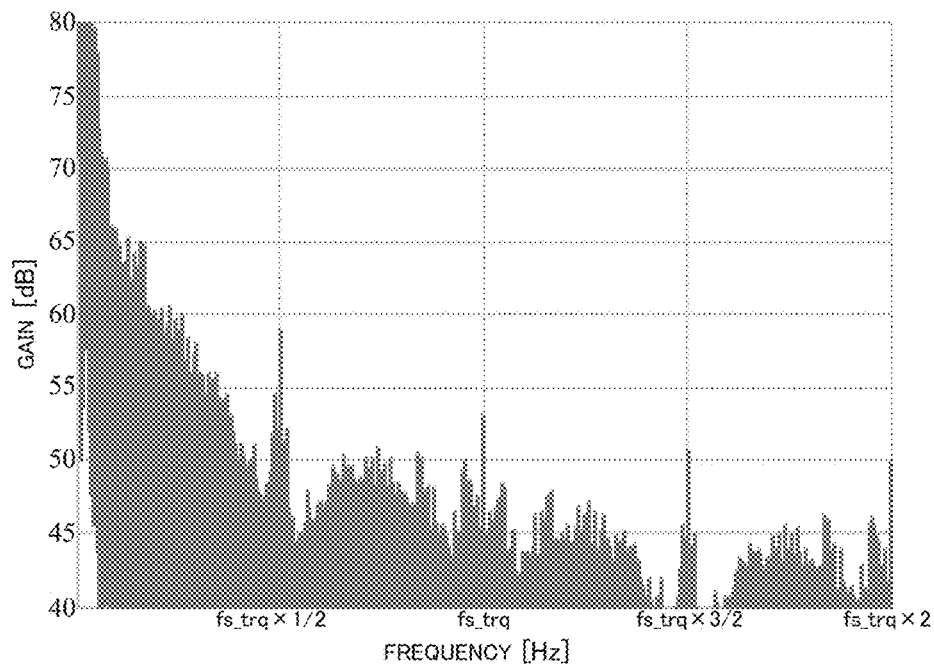
FIG. 8 is a graph showing an example of the power spectra of the current command value after applying the present invention.

A result, which is applied the present invention to the current command value having the power spectra shown in FIG. 3, is shown in FIG. 8. In similar to FIG. 3, in FIG. 8, the horizontal axis denotes the frequency [Hz] and the vertical axis denotes the power spectra of the current command value as the power spectra [dB]. Comparing the power spectra shown in FIG. 3 with the power spectra shown in FIG. 8, it is understood that the steep power spectra (portions surrounded with dashed lines), which are generated every half of the calculation frequency fs_trq, are reduced.

In the above example, although the apparatus comprises three notch filters, the number of the notch filters may be changeable in consistent with the number of the power spectra which is attenuated. For example, in a case that the power spectrum at the frequency fs_trq/2 is remarkably large and only this spectrum is attenuated, the specific frequency band removing section 110 may comprise only the notch filter 111 and the phase delay filter 115. Alternatively, in a case that the power spectrum at the frequency fs_trq×5/2 is also attenuated, the notch filter whose attenuation frequency is the present frequency may be added to the specific frequency band removing section 110.

Next, a difference of the effects between the notch filter and an LPF will be described.

Figure 9A:
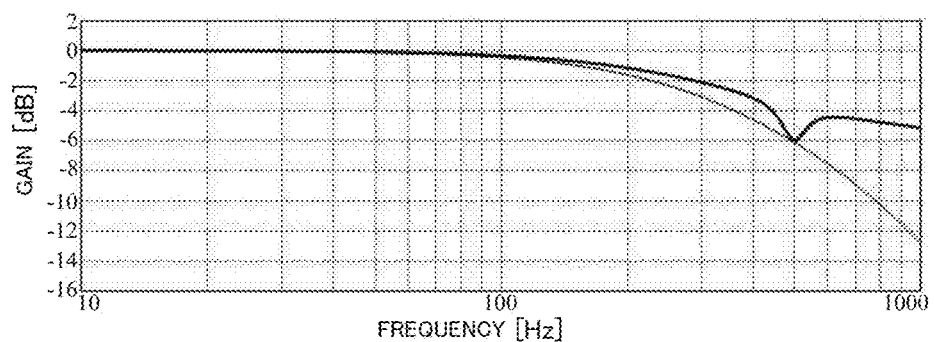
FIG. 9A and FIG. 9B are Bode diagrams which an effect of the present invention is simulated.
Figure 9B:
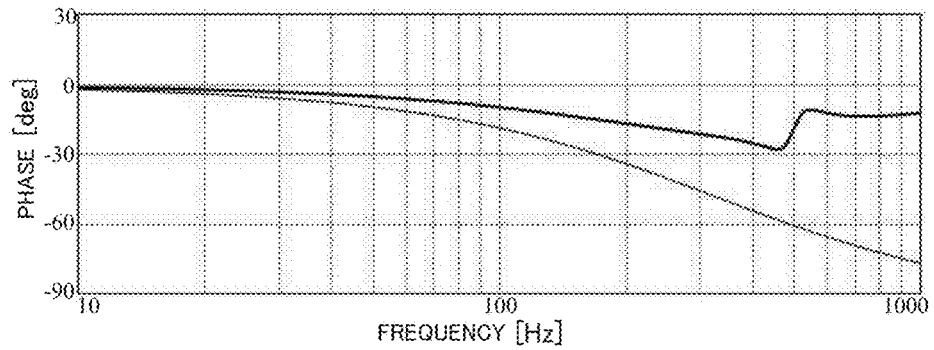
Figure 10:
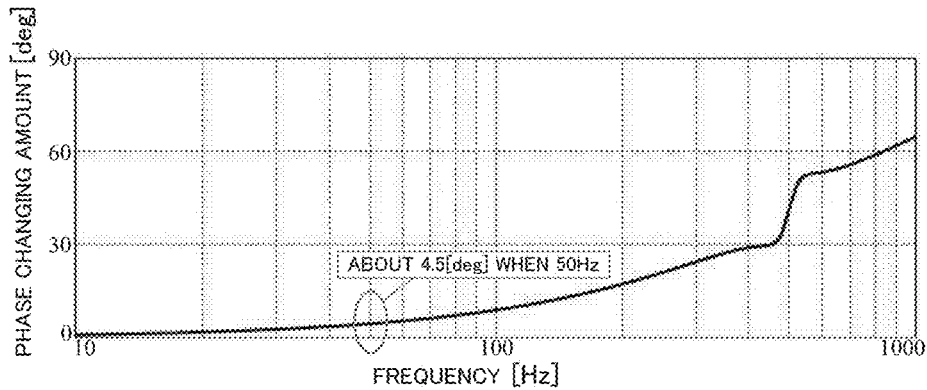
FIG. 10 is a frequency characteristic diagram showing the effect of the present invention.

Assuming that the period of the torque control system is "1 [ms] (fs_trq=1 [kHz])" and the attenuation frequency is "fs_trq×1/2=500 [Hz]", the gain and the phase of a system which comprises the notch filter whose attenuation frequency is 500 [Hz] and the first order phase delay filter, are shown in bold lines of Bode diagrams of FIG. 9A and FIG. 9B. Settings of the first order phase delay filter are, for example, the cutoff frequencies "$f_n$=600 [Hz]" and "$f_d$=300 [Hz]", and "$f_d$<$f_e$ (=500 [Hz])". On the contrary, in a case that the specific frequency band removing section 110 comprises the first order LPF 300 [Hz], the frequency characteristics are shown in thin lines of FIG. 9A and FIG. 9B. That is, the notch filter is set such that the gain of the notch filter at 500 [Hz] is coincident with the gain of the LPF 300 [Hz] at 500 [Hz]. The frequency characteristic of the phase changing amount is shown in FIG. 10, and the case that the phase at 50 [Hz] recovers about 4.5 [deg] is shown.

Figure 11:
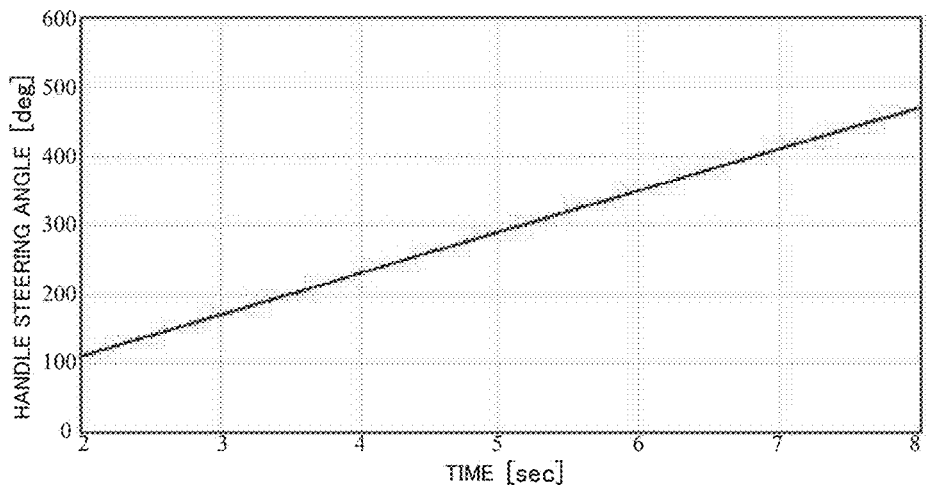
FIG. 11 is a characteristic diagram showing one example of a handle steering angle.
Figure 12:
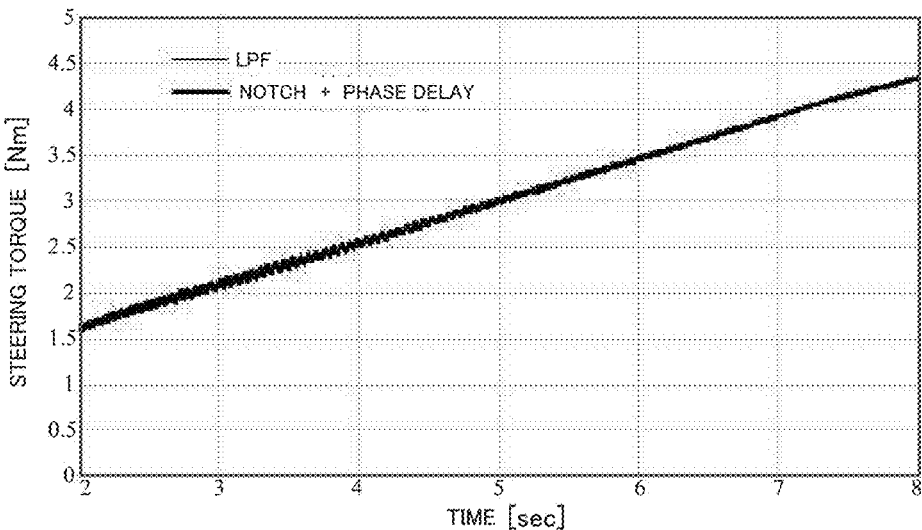
FIG. 12 is a characteristic diagram with reference to a simulation of a steering torque showing the effect of the present invention.
Figure 13:
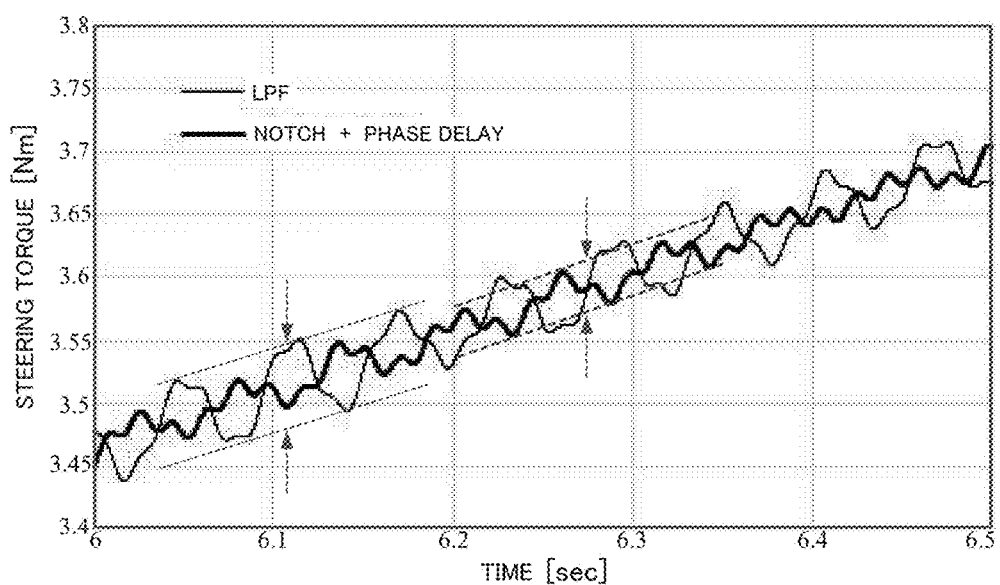
FIG. 13 is an enlarged view of FIG. 12.

Next, results of study of a simulation when steering in the electric power steering apparatus will be described, shown in FIG. 11 to FIG. 13. In a case that the handle steering angle (an angle of an upper portion of a torsion bar) is operated as shown in FIG. 11, a time response of the steering torque (a torsion bar torque) becomes a characteristic shown in FIG. 12. The bold line of FIG. 12 shows a steering torque response due to the notch filter and the phase delay filter, and the thin line shows the steering torque response in a case of applying the above LPF. Since the bold line and the thin line are overlapped in the graph and it is not distinguished between the bold line and the thin line, an enlarged graph is shown in FIG. 13. It is possible to confirm that the vibration can be reduced according to an influence of recovering the phase, and it is shown that a stability of the EPS system is improved and the vibration which is generated due to the influence of the feedback loop is improved.

Figure 14:
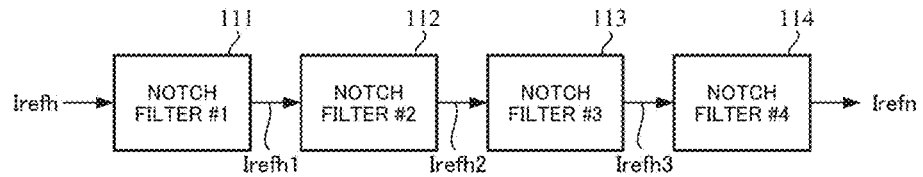
FIG. 14 is a block diagram showing another configuration example of the specific frequency band removing section (the second embodiment)

In the above example, although the specific frequency band removing section 110 comprises the notch filters 111, 112 and 113 and the phase delay filter 115, it may comprise the notch filters 111, 112, 113 and 114 as shown in FIG. 14 (the second embodiment).

That is, as shown in FIG. 14, the specific frequency band removing section 110 has a configuration that four notch filters 111, 112, 113 and 114 are connected in series. In order to attenuate the power spectra which are generated every half of the calculation frequency fs_trq (=1/Ts_trq) of the torque control system, the attenuation frequencies of the notch filters 111, 112, 113 and 114 are set to "fs_trq/2", "fs_trq", "fs_trq×3/2" and "fs_trq×2", respectively.

Figure 15:
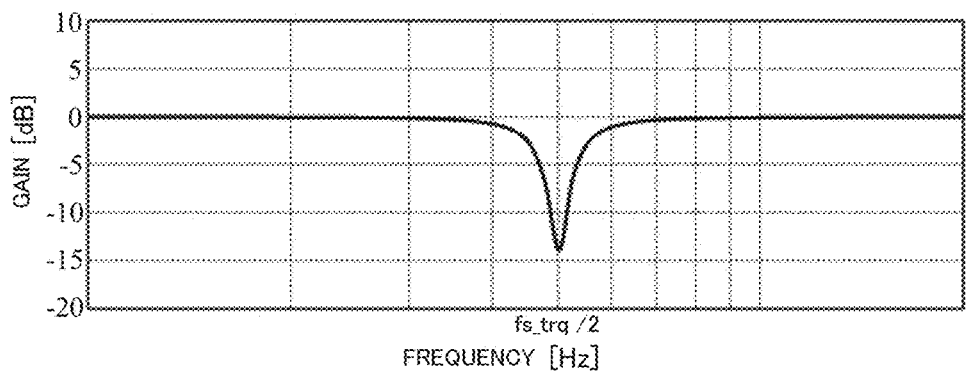
FIG. 15 is a frequency characteristic diagram showing another example of the amplitude characteristic of the notch filter.

The respective notch filters 111, 112, 113 and 114 are designed as the second order filter, and the frequency characteristic is represented by the transfer function G of the Equation 1. In this case, the amplitude characteristic has the attenuation characteristic, for example, as shown in FIG. 15. In FIG. 15, the horizontal axis denotes the frequency [Hz], the vertical axis denotes the amplitude (gain) [dB] and the amplitude is smallest at the attenuation frequency $f_e$ ("fs_trq/2" in the present example).

The parameter of the Equation 1 which is preliminarily calculated and are set as "$f_e$=fs_trq/2" is stored in the notch filter 111, and the notch filter 111 transforms the inputted current command value based on the Equation 1. Similarly, the parameters of the Equation 1 which are preliminarily calculated and are set as "$f_e$=fs_trq", "$f_e$=fs_trq×3/2" and "$f_e$=fs_trq×2" are respectively stored in the notch filters 112, 113 and 114, and the notch filters 112, 113 and 114 respectively transform the inputted current command value Irefh based on the Equation 1. As well, as described above, the sample-and-hold section is disposed between the maximum-output limiting section 102 of the torque control system and the specific frequency band removing section 110 of the current control system.

Figure 16:
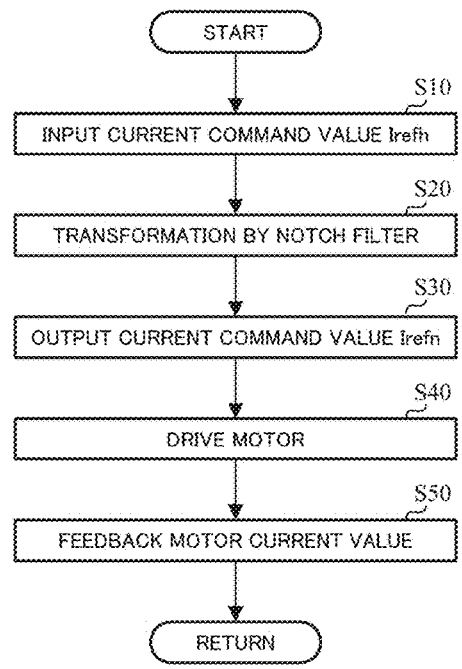
FIG. 16 is a flowchart showing another operation example of the present invention (the second embodiment)

In such a configuration, the operation example of the current control system will be described with reference to a flowchart of FIG. 16.

The current command value Irefh outputted from the maximum-output limiting section 102 of the torque control system is inputted into the specific frequency band removing section 110 of the current control system (Step S10). In the specific frequency band removing section 110, the notch filter 111 inputs the current command value Irefh and transforms the current command value Irefh based on the Equation 1 by using the stored parameter. The transformed current command value Irefh1 is inputted into the notch filter 112 at the next stage and is transformed to the current command value Irefh2 based on the Equation 1, similarly. The current command value Irefh2 is further inputted into the notch filter 113 and is transformed to the current command value Irefh3 based on the Equation 1, similarly. The current command value Irefh3 is further inputted into the notch filter 114 at the final stage, and is transformed to the current command value Irefn based on the Equation 1, similarly (Step S20). The current command value Irefn, which is processed at the specific frequency band removing section 110 in this way, is outputted (Step S30). The current command value Irefn is inputted into the subtracting section 103, and thereafter the above-described operations are similarly performed and the motor 20 is PWM-driven (Step S40). The motor current value Im which is detected by the motor current detector 107 is fed-back to the subtracting section 103 (Step S50).

The above operations are repeated in the calculation period Ts_cur.

Figure 17:
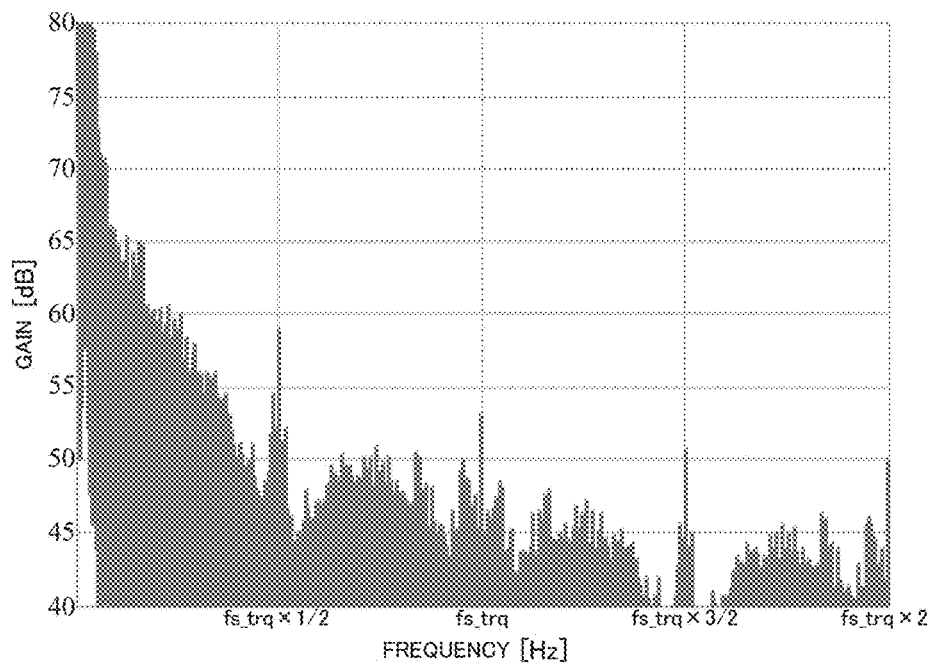
FIG. 17 is a graph showing another example of the power spectra of the current command value after applying the present invention.

A result, which is applied the present invention to the current command value having the power spectra shown in FIG. 3, is shown in FIG. 17. In similar to FIG. 3, in FIG. 17, the horizontal axis denotes the frequency [Hz] and the vertical axis denotes the power spectra of the current command value as the power spectra [dB]. Comparing the power spectra shown in FIG. 3 with the power spectra shown in FIG. 17, it is understood that the steep power spectra (portions surrounded with dashed lines), which are generated every half of the calculation frequency fs_trq, are reduced.

In the above example, although the apparatus comprises four notch filters, the number of the notch filters may be changeable in consistent with the number of the power spectra which is attenuated. For example, in a case that the power spectrum at the frequency fs_trq/2 is remarkably large and only this spectrum is attenuated, the specific frequency band removing section 110 may comprise only the notch filter 111. Alternatively, in a case that the power spectrum at the frequency fs_trq×5/2 is also attenuated, the notch filter whose attenuation frequency is the present frequency may be added to the specific frequency band removing section 110.

Next, the difference of the effects between the notch filter and the LPF will be described.

Figure 18A:
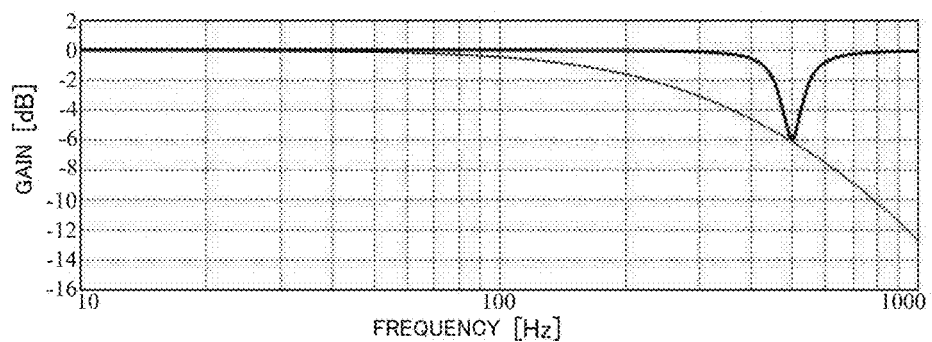
FIG. 18A and FIG. 18B are Bode diagrams which the effect of the present invention is simulated.

Assuming that the period of the torque control system is "1 [ms] (fs_trq=1 [kHz])" and the attenuation frequency is "fs_trq×1/2=500 [Hz]", the gain and the phase of the system which comprises the notch filter whose attenuation frequency is 500 [Hz] and the first order phase delay filter, are shown in bold lines of Bode diagrams of FIG. 18A and FIG.

Figure 18B:
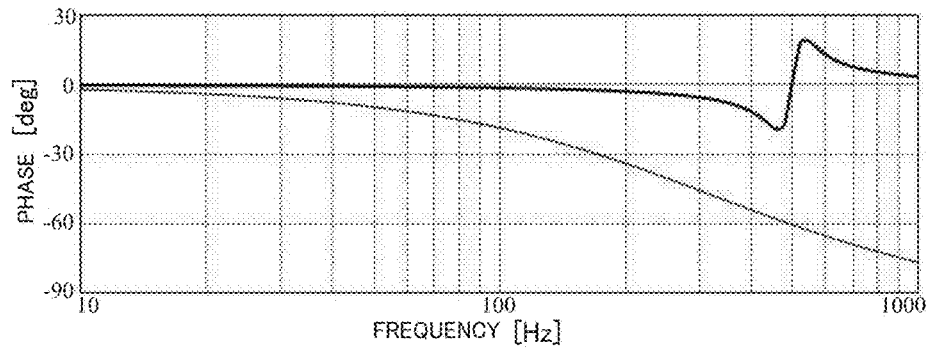
Figure 19:
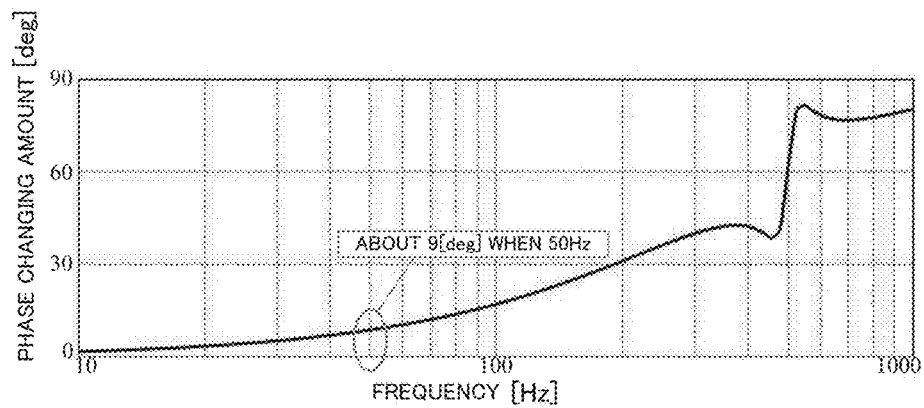
FIG. 19 is a frequency characteristic diagram showing the effect of the present invention.

18B. On the contrary, in a case that the specific frequency band removing section 110 comprises the first order LPF 300 [Hz], the frequency characteristics are shown in thin lines of FIG. 18A and FIG. 18B. That is, the notch filter is set such that the gain of the notch filter at 500 [Hz] is coincident with the gain of the LPF 300 [Hz] at 500 [Hz]. The frequency characteristic of the phase changing amount is shown in FIG. 19, and the case that the phase at 50 [Hz] recovers about 9 [deg] is shown.

Figure 20:
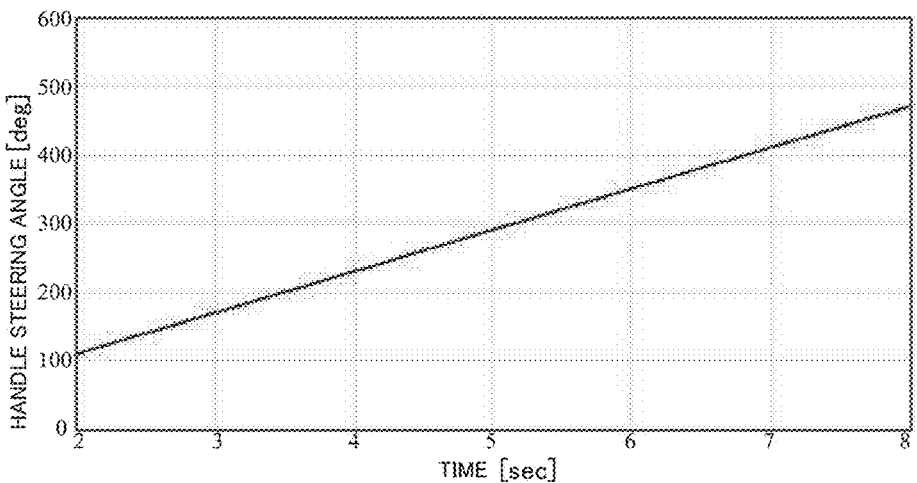
FIG. 20 is a characteristic diagram showing one example of a handle steering angle.
Figure 21:
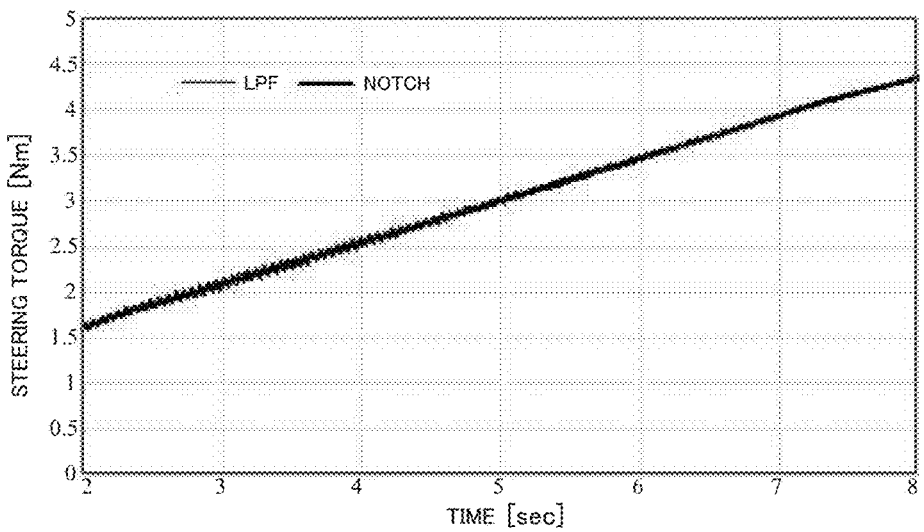
FIG. 21 is a characteristic diagram with reference to the simulation of the steering torque showing the effect of the present invention.
Figure 22:
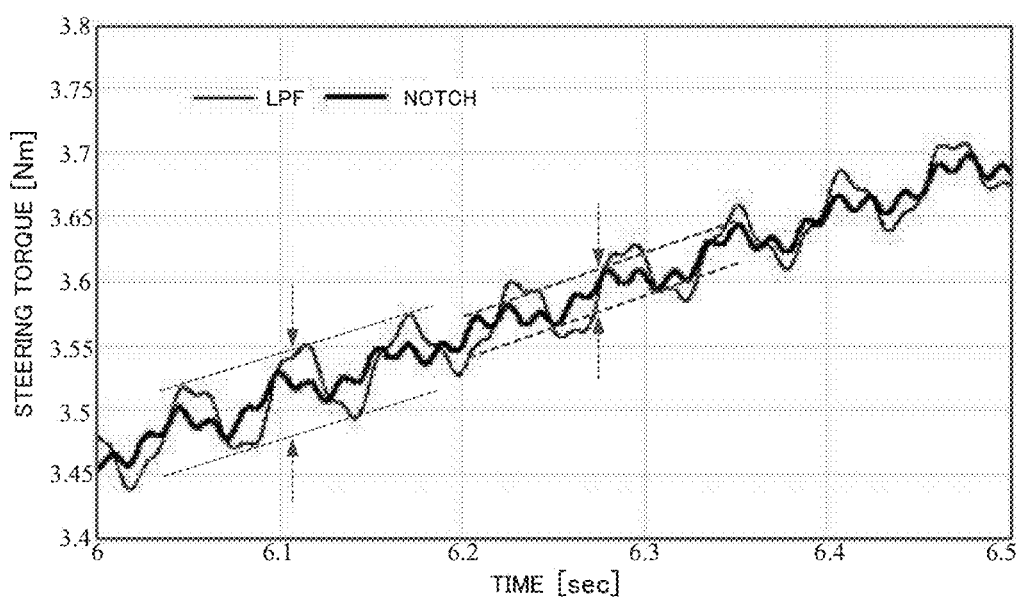
FIG. 22 is an enlarged view of FIG. 21.

Next, the results of study of a simulation when steering in the electric power steering apparatus will be described, shown in FIG. 20 to FIG. 22. In a case that the handle steering angle (the angle of the upper portion of the torsion bar) is operated as shown in FIG. 20, a time response of the steering torque (the torsion bar torque) becomes a characteristic shown in FIG. 21. The bold line of FIG. 21 shows a steering torque response due to the notch filter, and the thin line shows the steering torque response in a case of applying the above LPF. Since the bold line and the thin line are overlapped in the graph and it is not distinguished between the bold line and the thin line, an enlarged graph is shown in FIG. 22. It is possible to confirm that the vibration can be reduced according to an influence of recovering the phase, and it is shown that the stability of the EPS system is improved and the vibration which is generated due to the influence of the feedback loop is improved.

Figure 23:
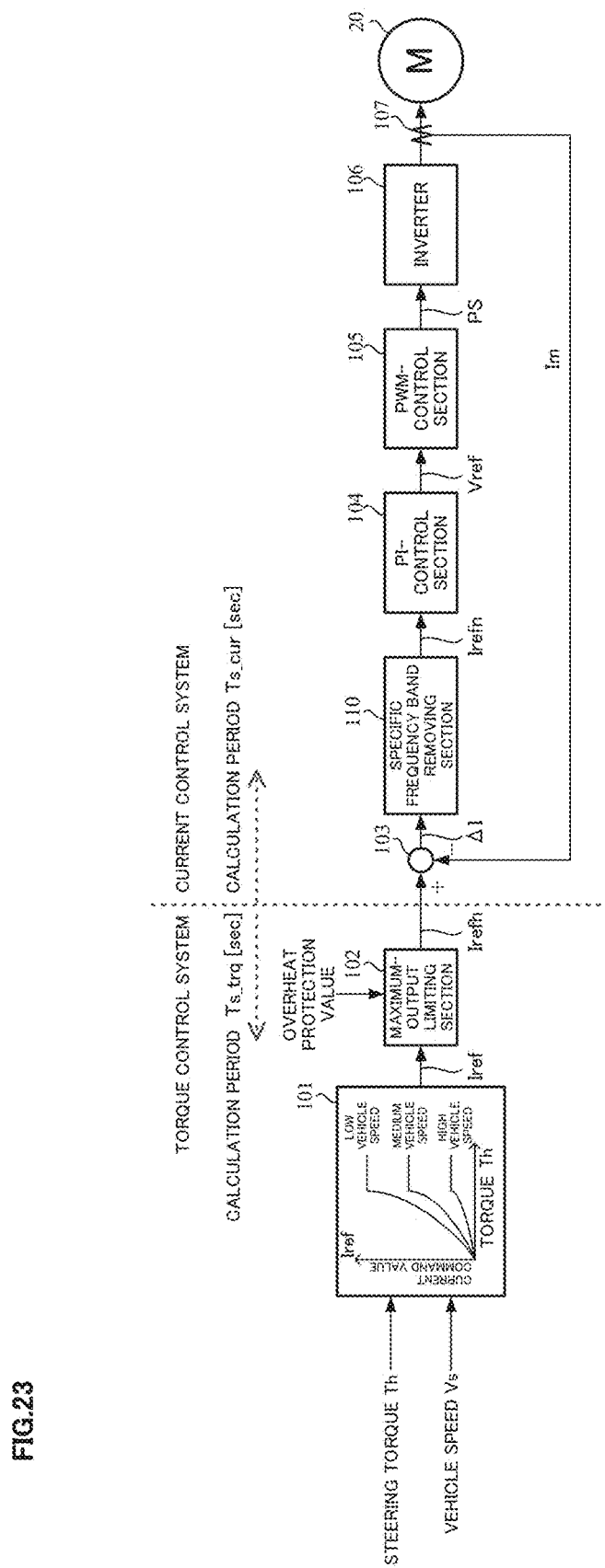
FIG. 23 is a block diagram showing still another configuration example of the present invention (the third embodiment)

In the above first and second embodiments, although the specific frequency band removing section 110 is disposed at the rear stage of the maximum-output limiting section 102 and the current command value Irefh is inputted into the specific frequency band removing section 110, the specific frequency band removing section 110 may be disposed at the rear stage of the subtracting section 103 and the current deviation ΔI may be inputted into the specific frequency band removing section 110 as shown in FIG. 23 (the third embodiment).

In the electric power steering apparatus according to the present invention, the brushless motor may be used as a driving source, and the brushless motor is driving-controlled by a vector control system. The vector control system will be described as follows.

Figure 24:
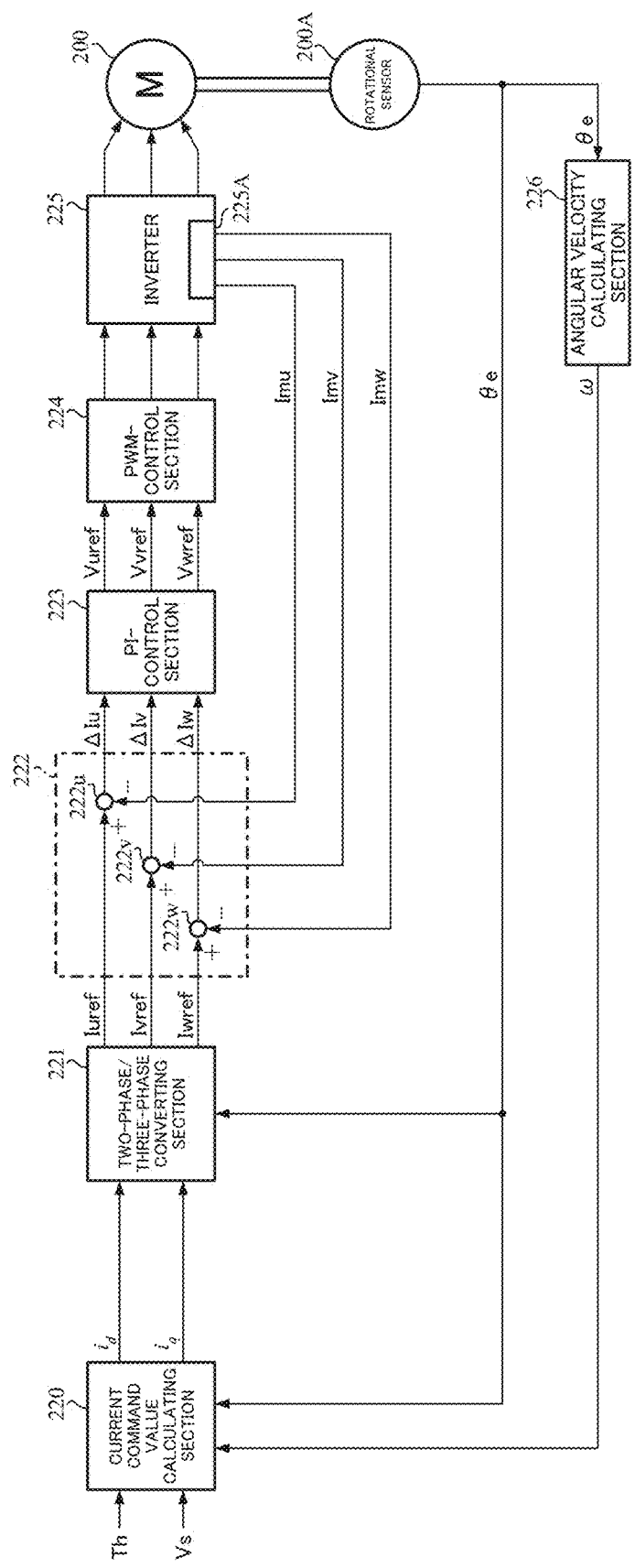
FIG. 24 is a block diagram showing one example of a vector control system (three-phase feedback type) to which the present invention is applicable.

In a vector control system shown in FIG. 24, a current command value calculating section 220 to calculate and correct a d-axis current command value $i_d$ and a q-axis current command value $i_q$ is disposed, and the steering torque Th, the vehicle speed Vs, a motor angle (a rotational angle) $\theta_e$ from a rotational sensor 200A which is coupled to the motor 200 and a motor angular velocity ω which is calculated at an angular velocity calculating section 226 are inputted into the current command value calculating section 220. The d-axis current command value $i_d$ and the q-axis current command value $i_q$, which are calculated at the current command value calculating section 220, are inputted into a two-phase/three-phase converting section 221 and then are converted into three-phase current command values Iuref, Ivref and Iwref in synchronous with the motor angle $\theta_e$. The three-phase current command values Iuref, Ivref and Iwref are inputted into a subtracting section 222 (222u, 222v and 222w), and the current deviations ΔIu, ΔIv and ΔIw which subtract the motor current values Imu, Imv and Imw, which are detected by the motor current detector 225A, from the three-phase current command values Iuref, Ivref and Iwref, are calculated, respectively. The calculated current deviations ΔIu, ΔIv and ΔIw are inputted into a PI-control section 223, PI-controlled three-phase voltage control command values Vuref, Vvref and Vwref are inputted into a PWM-control section 224, and the motor 200 are driven via an inverter 225 based on respective phase duties which are calculated at the PWM-control section 224.

In FIG. 24, although the motor current detector 225A is disposed in the inverter 225, the motor current is detectable by using supply-lines to the motor 200 or the like.

Figure 25:
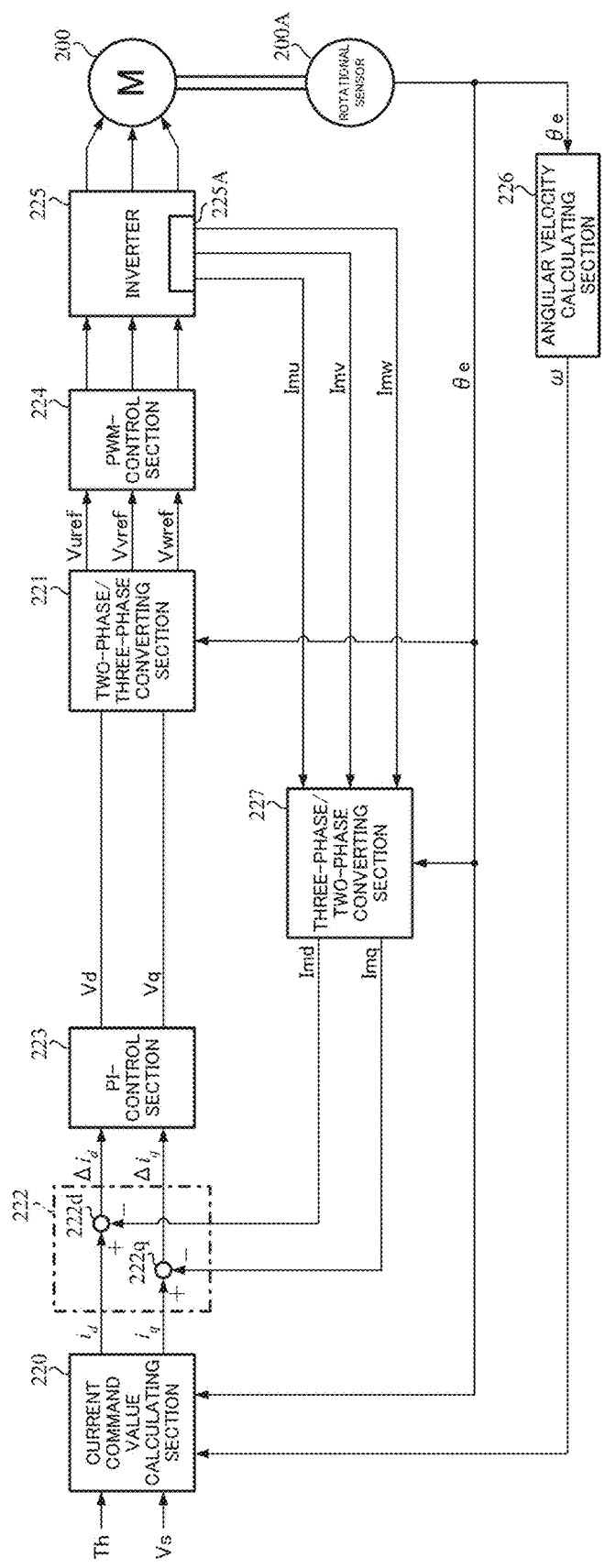
FIG. 25 is a block diagram showing another example of the vector control system (two-phase feedback type) to which the present invention is applicable.

In a vector control system shown in FIG. 25, a three-phase/two-phase converting section 227 that converts the three phase motor currents Imu, Imv and Imw detected by the motor current detector 225A into the two-phase currents Imd and Imq in synchronous with the motor angle $\theta_e$, is disposed. The d-axis current command value $i_d$ and the q-axis current command value $i_q$, which are calculated and are corrected at the current command value calculating section 220, are inputted into the subtracting section 222 (222d and 222q), and current deviations $\Delta I_d$ and $\Delta I_q$ being differences between the d-axis current command value $i_d$ and the q-axis current command value $i_q$ and the two-phase currents Imd and Imq from the three-phase/two-phase converting section 227 are calculated at the subtracting section 222, respectively. The current deviations $\Delta I_d$ and $\Delta I_q$ are inputted into the PI-control section 223, and the PI-controlled two-phase voltage command values Vd and Vq are inputted into the two-phase/three-phase converting section 221 and are converted into three-phase voltage command value Vuref, Vvref and Vwref at the two-phase/three-phase converting section 221 in synchronous with the motor angle $\theta_e$. The similar operations in a case of FIG. 24 are performed in the subsequent operations.

The vector control system of FIG. 24 is a three-phase feedback-type vector control system that the three-phase motor currents Imu, Imv and Imw are fed-back, and the vector control system of FIG. 25 is a two-phase feedback-type vector control system that the three-phase motor currents Imu, Imv and Imw are converted into the two-phase currents Imd and Imq, and the two-phase currents Imd and Imq are fed-back. The present invention is applicable to both the three-phase feedback-type vector control system and the two-phase feedback-type vector control system.

EXPLANATION OF REFERENCE NUMERALS 1 handle
2 column shaft (steering shaft, handle shaft)
10 torque sensor
12 vehicle speed sensor
20, 200 motor
100 control unit (ECU)
101, 220 current command value calculating section
102 maximum-output limiting section
104, 223 PI-control section
105, 224 PWM-control section
106, 225 inverter
107 motor current detector
110 specific frequency band removing section
111, 112, 113, 114 notch filter
115 phase delay filter

The invention claimed is:
1. An electric power steering apparatus that comprises a torque control system to calculate a current command value based on at least a steering torque and a current control system to control a motor current value which passes through a motor based on said current command value:
wherein a first calculation period of said torque control system is equal to or longer than a second calculation period of said current control system,
wherein said current control system comprises a specific frequency band removing section that attenuates a frequency component which multiplies at least one natural number by an approximate half of a calculation frequency of said torque control system to said current command value, and wherein said specific frequency band removing section comprises notch filters that set an attenuation frequency.

2. The electric power steering apparatus according to claim 1, wherein said specific frequency band removing section further comprises a phase delay filter that has a cutoff frequency, which is set to a lower frequency side than a frequency which is attenuated by said notch filters, and is connected to said notch filters in series.

3. The electric power steering apparatus according to claim 2, wherein said notch filters comprise plural notch filters that are connected in series.

4. The electric power steering apparatus according to claim 3, wherein said phase delay filter comprises a first order or a second order configuration.

5. The electric power steering apparatus according to claim 2, wherein said phase delay filter comprises a first order or a second order configuration.

6. The electric power steering apparatus according to claim 2, wherein said specific frequency band removing section inputs said current command value that is outputted from said torque control system, or inputs a current deviation between said current command value and said motor current value.

7. The electric power steering apparatus according to claim 2, wherein said motor is a brushless motor, and said brushless motor is driving-controlled by a vector control system.

8. The electric power steering apparatus according to claim 7, wherein said vector control system is a three-phase feedback-type vector control.

9. The electric power steering apparatus according to claim 7, wherein said vector control system is a two-phase feedback-type vector control.

10. The electric power steering apparatus according to claim 1, wherein said notch filters comprise plural notch filters that are connected in series.

11. The electric power steering apparatus according to claim 1, wherein said specific frequency band removing section inputs said current command value that is outputted from said torque control system, or inputs a current deviation between said current command value and said motor current value.

12. The electric power steering apparatus according to claim 1, wherein said motor is a brushless motor, and said brushless motor is driving-controlled by a vector control system.

13. The electric power steering apparatus according to claim 12, wherein said vector control system is a three-phase feedback-type vector control.

14. The electric power steering apparatus according to claim 12, wherein said vector control system is a two-phase feedback-type vector control.

\* \* \* \* \*